US012615084B1

(12) United States Patent
Murphy et al.

(10) Patent No.: US 12,615,084 B1
(45) Date of Patent: Apr. 28, 2026

(54) SECUREMENT OF OPTICAL FIBERS AGAINST EAVESDROPPING USING MONITORING OF SIGNALS ON A FIBER

(71) Applicant: Network Integrity Systems, Inc., Hickory, NC (US)

(72) Inventors: Cary R. Murphy, Hickory, NC (US); Adam R. Millan, Burke, VA (US); Dave Eric Cunningham, Conover, NC (US); Mark K. Bridges, Hickory, NC (US); Robert Wheeler Dennis, Claremont, NC (US); Trampus L. Landrum, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 0 days.

(21) Appl. No.: 19/397,252

(22) Filed: Nov. 21, 2025

(51) Int. Cl.
| | |
|---|---|
| *H04B 10/00* | (2013.01) |
| *H04B 10/071* | (2013.01) |
| *H04K 3/00* | (2006.01) |
| *H04L 9/40* | (2022.01) |
| *H04J 14/00* | (2006.01) |

(52) U.S. Cl.
CPC ........... H04B 10/071 (2013.01); H04K 3/825 (2013.01); H04L 63/1475 (2013.01)

(58) Field of Classification Search
CPC ...... H04B 10/071; H04B 10/85; G01H 9/004; G01H 9/006
See application file for complete search history.

(56) References Cited

U.S. PATENT DOCUMENTS

| | | | |
|---|---|---|---|
| 2009/0148159 A1* | 6/2009 | Schofield | H04B 10/071 398/40 |
| 2022/0263587 A1* | 8/2022 | Xia | H04B 10/85 |
| 2025/0080241 A1* | 3/2025 | Szczerban | H04B 10/071 |

* cited by examiner

*Primary Examiner* — Daniel G Dobson
(74) *Attorney, Agent, or Firm* — Adrian D. Battison; Ryan W. Dupuis; Ade & Company Inc.

(57) ABSTRACT

A method is provided for securement of a network of optical fibers against attempts to detect sounds such as private conversations emitted in the vicinity of the fiber network such as in a secure room. The cable entering the room contains a plurality of fibers some of which have data and some are unused. It has been found that the sensitivity of systems such as DAS monitoring systems can detect such conversations from the vibration of the fibers in the vicinity. The method includes monitoring at least some of the fibers for detecting transmission therealong of light signals used for monitoring of fiber vibration which provide information on the sounds. An indication alert is emitted when detected of an intrusion attempt. A jamming signal can be transmitted along the detected fiber to prevent the monitoring. The monitoring and jamming can take place at a patch panel where the fibers are connected.

30 Claims, 5 Drawing Sheets

SECUREMENT OF OPTICAL FIBERS AGAINST EAVESDROPPING USING MONITORING OF SIGNALS ON A FIBER

This invention relates to a method and/or an apparatus for securement of optical fibers against intrusion attempts to detect sounds emitted in the vicinity of the fiber network so as to provide security against eavesdropping of signals unintentionally introduced onto the fibers.

BACKGROUND OF THE INVENTION

Optical fibers are used widely for data communication and other purposes and thus are installed in the area of many offices, workspaces and even secure communications systems.

Many systems for monitoring the security of the fibers used for data communication are provided such as the INTERCEPTOR™ and VANGUARD™ system from Network Integrity Systems which monitors any movement of a fiber which might be indicative of an intrusion attempt. Systems of this type are shown in U.S. Pat. Nos. 7,693,359, 8,094,977, 7,706,641, of the present applicant, the disclosures of which are incorporated herein by reference. This mode to security monitoring assumes that the fiber is secure along its length when installed so that any person wanting to monitor traffic along the fiber will actively have to access the fiber in an intrusion event to install a monitoring device.

Technological advances in such monitoring systems for monitoring vibrations in fibers have more recently over the past 10 or more years used a technique called distributed fiber optic sensing, specifically Phase based (aka quantitative) Distributed Acoustic Sensing (DAS). These techniques have produced significant enhancements in sensitivity. Many systems for monitoring the security of the fibers used perimeter monitoring are provided such as the SENTINEL™ system from Network Integrity Systems which monitors any movement of a fiber which might be indicative of an intrusion attempt. Systems of this type are shown in U.S. Pat. Nos. 11,055,984, 11,170,618, as well as allowed U.S. patent application Ser. No. 17/890,359 of the present applicant, the disclosures of which are incorporated herein by reference.

Distributed Acoustic Sensing (DAS) systems employ an optical fiber together with an interrogator. These sensing systems may rely on detecting phase changes in backscattered light signals to determine changes in strain caused by the strain sources along the length of the optical fiber. To measure the phase changes, measurements of light signals from two different points along the optical fiber are taken to determine the total amount of strain over that distance. The distance between these two points is referred to as the gauge length and is fixed for each acquisition period. The gauge length is one of the significant parameters for the DAS systems having a direct impact on ensuing sensitivity, signal-to-noise-ratio (SNR), and spatial resolution of detected DAS data signals.

Rayleigh scattering-based distributed acoustic sensing (DAS) systems use fiber optic cables to provide distributed strain sensing. In DAS, the optical fiber cable becomes the sensing element and measurements are made, and in part processed, using an attached optoelectronic device. Such a system allows acoustic frequency strain signals to be detected over large distances and in harsh environments.

In Rayleigh scatter-based distributed fiber optic sensing, a coherent laser pulse is sent along an optic fiber, and scattering sites within the fiber cause the fiber to act as a distributed interferometer with a gauge length approximately equal to the pulse length. The intensity of the reflected light is measured as a function of time after transmission of the laser pulse. This is known as Coherent Rayleigh Optical Time Domain Reflectometry (COTDR). When the pulse has had time to travel the full length of the fiber and back, the next laser pulse can be sent along the fiber. Changes in the reflected intensity of successive pulses from the same region of fiber are caused by changes in the optical path length of that section of fiber. This type of system is very sensitive to both strain and temperature variations of the fiber and measurements can be made almost simultaneously at all sections of the fiber.

The term DAS is used herein generically and is representative of any fiber optic eavesdropping technology of this general type. In such systems the signals are typically narrow wavelength on the order of 1 nm, low duty cycle of typically 100 nS at a 10 kHz repetition rate, high-powered laser pulses approaching the limits of Class 1 and have a wavelength commonly in the C-Band of 1550 nm while restricted to a single ITU DWDM channel.

In data center equipment rooms, network equipment rooms in locations around office buildings, and other locations, it is common practice for a fiber optic cable to enter the room with all fibers connectorized and plugged into a patch panel. This arrangement makes adding circuits as simple as plugging them in, and the unused fibers are prepared and ready for use. Thus the installation of the optical fiber cable and the fibers contained therein leads the presence of the fibers throughout the building, passing often through walls and floors with no concern as to where the fibers are located relative to sensitive areas where sensitive material may be communicated.

SUMMARY OF THE INVENTION

The present inventors have however determined that signals which are unintentionally introduced onto an optical fiber can be detected remotely giving the agency monitoring the fiber information on the source of the signals.

This is particularly relevant to sounds including voices which are introduced onto such fibers by mechanical vibration of the fiber giving the agency monitoring the fiber the ability to listen to the sounds such as voices to eavesdrop on a conversation at the location of the fiber. This is particularly applicable and relevant to voices, but can of course relate to any other sounds which can be communicated to the fiber unintentionally and may contain, albeit unintentionally, sensitive information.

It is well known in the industry that a significant expense for installing fiber optic cabling is the labor itself, and the incremental cost impact of installing a cable with more fibers than are needed is relatively insignificant. This practical practice leads to a host of unused fibers, commonly connectorized and in the patch panel, awaiting future expansion.

Often, they are stripped down to either 250μ primary coating, or 900μ coating as the cable jacketing is stripped away to access the needed fibers. This increases the length of the fiber which is free to vibrate in response to any sounds in the environment.

In particular the present inventors have determined that recent developments in sensitivity of the above DAS system (or similar systems) have actually allowed a remote agency to monitor in full and accurate detail a conversation which takes place at a remote location along the fiber. This monitoring can be carried out at any location along a fiber which can be many kilometers in length. This monitoring can be carried out at, for example, repeater nodes at far remote locations from the location where the sounds to be monitored are located.

As optical networks become more ubiquitous, equipment rooms and patch panels are being distributed throughout business complexes. As a consequence, unused fibers are often exposed.

The present inventors have thus realized that by placing a DAS system, particularly a quantitative (phase) system or other similar device at any location which could be in a remote location miles away with access to fibers on the other end of the fiber path, one could listen in and record conversations errantly assumed to be confidential.

This is particularly applicable to executive board rooms and any other room in a building containing a fiber optic network where sensitive information is released and contains sounds which can be monitored to determine information about the sensitive information. The monitoring can be carried out anywhere along the fiber path without the need for physical access to the room concerned and totally undetectable via normal bug-sniffing measures. A secure room as used herein includes any enclosure which defines any area where such secure communications may take place with the expectation of privacy. This can include separate buildings or structures. It can also include cubicles whether free standing or integral with another structure.

The problem is particularly but not exclusively applicable to unused fibers because these are considered to be inactive, contain no data and hence are not monitored by the above system for intrusion events. However the techniques and solution used herein are also applicable to fibers used for data communications.

According to a first aspect of the invention therefore there is provided a method for securement of optical fibers in a network of optical fibers against intrusion attempts to detect sounds emitted in the vicinity of the fiber network;

where the network comprises at least one fiber cable containing a plurality of individual optical fibers, at least some of the fibers being selected for connection to data transmission systems for transmission of data along the selected fibers, the method comprising:

monitoring at least some of the fibers for detecting transmission therealong of light signals used for monitoring of fiber vibration and/or movement;

and in response to a detection of the light signals providing an indication alert of an intrusion attempt to detect said sounds.

According to a second aspect of the invention therefore there is provided a method for securement of optical fibers in a network of optical fibers comprising:

providing a secure room in which sounds are created which contain sensitive data;

wherein at least one cable containing optical fibers is located in the vicinity of the secure room so that at least one of the fibers vibrates in response to the sounds in the room;

monitoring at least some of the fibers for detecting transmission therealong of light used for monitoring fiber vibration and/or movement;

and in response to a detection of the light signals providing an indication alert of an intrusion attempt to detect said sounds.

According to a third aspect of the invention therefore there is provided a method for securement of optical fibers in a network of optical fibers comprising:

providing a secure room in which sounds are created which contain sensitive data;

wherein at least one cable containing optical fibers is located in the vicinity of the secure room so that at least one of the fibers vibrates in response to the sounds room;

wherein at least some of the fibers might contain transmitted data;

wherein at least some of the fibers are dark or unused;

monitoring data fibers for intrusion attempts using a first method;

monitoring at least some of the unused fibers for detecting transmission therealong of light signals used for monitoring fiber vibration and/or movement;

and in response to a detection of the light signals providing an indication alert of an intrusion attempt to detect said sounds.

According to a fourth aspect of the invention therefore there is provided a method for securement of optical fibers in a network of optical fibers against intrusion attempts to detect sounds emitted in the vicinity of the fiber network;

where the network comprises at least one fiber cable containing a plurality of individual optical fibers, at least some of the fibers being selected for connection to data transmission systems for transmission of data along the selected fibers, the method comprising:

monitoring at least some of the fibers for detecting transmission therealong of light signals used for monitoring fiber vibration and/or movement which provide information on said sounds;

wherein in response to a detection of said light signals, carrying out wavelength analysis to determine the wavelength of said light signals and transmitting into the fiber a jamming light signal selected to interfere with said monitoring of fiber vibration and/or movement.

According to a fifth aspect of the invention therefore there is provided a patch panel for an optical fiber network comprising:

a plurality of first terminals for receiving and connecting to one end of each of a plurality of fibers of a fiber cable;

a plurality of second terminals each for connecting to a respective one of a plurality of outputs;

connections arranged such that signals on each fiber are communicated between the fiber and the respective output;

a signal monitoring system arranged for monitoring signals on at least some of the fibers for detecting transmission therealong of light signals used for monitoring fiber vibration and/or movement which provide information on sounds;

and an indicator system visible on the patch panel providing an indication of an intrusion attempt to detect said sounds.

In this arrangement therefore, the method assumes that some or all of the fibers used for data transmission, including the data from the secure room might already be monitored by other known methods set forth above to detect any intrusion attempt. This leaves the unused fibers available to an intruder which are typically not monitored for intrusion events because they are believed to contain no data of importance or due to the technique of intrinsic monitoring wherein one or a few fibers in a cable protect all of the fibers against handling and intrusion. Thus one aspect of the present invention focusses on the unused fibers as a potential source for intrusion. Thus in most cases all unused fibers are monitored as explained herein for any transmission on the unused fibers for unexpected signals indicative of an attempt to monitor vibrations of those fibers.

In some situations, at least some of the fibers which are monitored are data fibers which contain transmitted data and wherein the transmitted data is separated from other signals on the fiber to allow the other signals to be monitored to detect said light signals used for monitoring of fiber vibration and/or movement. The separation can be carried out by a wavelength division multiplexer (WDM) which extracts the data signal leaving the remining signal which can be considered to be nefarious to be detected.

In other situations at least some of the fibers which are monitored are unused or dark fibers which therefore do not contain transmitted data and all signals on the fiber are monitored to detect said light signals used for monitoring of fiber vibration and/or movement on the assumption that any signal in a dark fiber is nefarious.

The light signals to be detected might be of the pulsed type used in a phase based Distributed Acoustic Sensing system, but could also be modulated or varied by methods not involving amplitude modulation. These can include a broad wavelength such as the C Band at 1550 nm or a narrow wavelength signal such as an ITU standard DWDM wavelength. Preferably the pulsed laser signals are of the type used in a DAS system.

Preferably the monitored fibers are connected at one end to an input terminal of a patch panel and the monitoring is carried out at said one end at said patch panel.

Preferably the fibers are monitored by detecting an amplitude of the non-data signal which is typically equal to the integrated laser pulses.

Preferably the fibers are monitored by detecting the amplitude with added level monitoring as a failsafe, that is an indication alert is emitted when a signal appears and remains present.

Preferably the monitoring is carried out by a use of slope vs time algorithm to detect intermittent access to fibers. Such a detection algorithm suppresses false and nuisance alarms by characterizing the change in signal as a function of time, for example 3 dB in 4 seconds. This will alarm when a slope of signal change is representative of connecting a monitoring device.

Preferably the fiber network comprises a patch panel having a housing in which is provided a plurality of input and output terminals to which the fibers are attached and wherein the monitoring and detection system are located in the housing of the patch panel.

Preferably the patch panel includes an LED over each fiber pair indicating presence of activity. Preferably when no activity on the fiber is detected, the LED could be dark while the presence of a signal will cause the LED to be illuminated as a local visual indicator. In another embodiment, the LED would display a color indicating that no signal is detected, such as green, while changing color to indicate detected signal, such as red. Additional colors, such as amber, could be used to indicate an intermittent signal.

Preferably each monitored fiber includes a tap coupler where data on the fiber passes through and a smaller proportion is tapped for monitoring.

Preferably there is provided a central monitoring system which provides information for selecting which fibers expect activity and which are unused and hence do not expect activity so that this information can be correlated with data from the monitoring.

Preferably at least two of the monitored fibers are connected to a coupler for common monitoring of two or more fibers.

Preferably optical switches are provided for selecting one of more of the monitored fibers which are commonly monitored for detecting which of the fibers contains the pulsed laser signals.

Preferably there is provided a Fiber Optic Multicast Switch to allow individual fibers to be commonly monitored with a single detector. This can also be used as set out below to provide a jamming signal to the selected fibers.

Preferably in addition to monitoring the fibers and emitting a warning signal or indication, in response to a detection of said signals, a wavelength analysis is carried out to determine the wavelength of said signals and a jamming signal is transmitted into the fiber selected to interfere with said unauthorized monitoring of fiber vibration and/or movement to detect the sounds. The jamming signal is typically at the same wavelength.

Preferably, in response to the wavelength analysis, a tunable CW laser is used to generate the jamming signal matching the wavelength.

Preferably, in response to the wavelength analysis, an out of band OTDR signal is multiplexed in to the fiber, and measures the distance to the eavesdropping equipment.

Preferably, in response to the wavelength analysis, an out of band DAS signal is multiplexed in to the fiber and this can allow monitoring of the conversations or other sounds at the eavesdropping location.

Preferably, the out of band OTDR or DAS systems are multiple wavelength capable in order to compensate for the eavesdropping adversary attempts to interfere with the jamming signal by changing wavelengths or injecting jamming wavelengths.

Preferably the laser comprises a high-power non-CW Fabry-Perot laser for wavelength chirping. Wavelength chirping is an effect obtained by certain lasers where the wavelength changes dependent on certain conditions such as temperature. When pulsing a laser, the time that the laser is pulsed "on" will cause the laser to heat. This heating is due to the temperature dependence of the refractive index and bandgap energy in the semiconductor material, causing a physical expansion that increases the lasing wavelength that is typically 0.4 to 0.7 nm/kelvin, Then, during the off period, the laser cools back down returning to the original (lowest) wavelength. This cycle causes a chirping of the wavelength, the degree of which is dictated by the length of time that the laser is being pulsed "on". This is particularly prevalent at the relatively high power of an OTDR, but can be created by a dedicated pulsed laser driver.

Preferably in response to the wavelength analysis, a laser signal is used to transmit the jamming signal as jamming disinformation.

Preferably in response to the wavelength analysis, a laser signal is used to transmit the jamming signal as a jamming overwhelming signal.

Preferably in response to the wavelength analysis a laser signal is used to transmit the jamming signal and wherein the analysis and transmission of the jamming signal are repeatedly and periodically cycled to compensate for a changing wavelength of the monitoring light signals generated by a transmitter.

Preferably in response to a detection of the pulsed laser signals on a fiber, the jamming signal is transmitted into the fiber while continuing to monitor all other fibers.

Preferably a 1×N splitter is used to transmit the jamming signal to a plurality of the fibers.

Preferably the jamming signal is pulsed in time randomly, and/or pulsed with randomize pulse widths and/or random pulsed occurrence.

This invention solves this problem in a number of ways, as set forth above and as described in more detail below.

For proper protection, all unused fibers must be monitored at their termination point for unexpected light transmission.

DAS systems typically use an extremely narrow spectral width laser with significant wavelength filtering at the input of the detection optoelectronics. This complicates any jamming methods as the jamming wavelength must precisely match that of the eavesdropping equipment.

Knowing this, a skillful adversary might change monitoring wavelengths or rotate between wavelengths when jamming is detected.

In a first solution a passive detection system is used which does not include the jamming system set forth above. In this method, one or more of the following may be used:

—a— Broad wavelength detection is carried out and electronics to carry this out are on every unused fiber pair.

—b— a 2×1 combiner sensing RX and TX fibers combines the signals into a single detector. As most optical circuits require 2 fibers, a transmit (Tx) and a receive (Rx), both are coupled together using an optical device such as a 1×2 fiber optic coupler. This decreases the number of circuits required for monitoring, and thus cost, by a factor of 2.

—c— the use of a Combination 1×N coupler feeding a single detector from a group of fibers. For example, if 32 fibers require monitoring, a 1×32 coupler can be used to reduce the number of optoelectronic circuits to just one. The downside of this coupler is lack of knowledge of which fiber is being monitored, but one would still be alert to the unapproved fiber use.

—d— the use of a Combination 1×N as above with additional optical switches to then scan for fiber in alarm. As optical switches tend to be costlier than detectors, and that this would require significant blind time with every scan cycle, the use this method must be taken under careful consideration. The downside is long dead time during time division multiplexing (TDM).

—e— the use of a Combination as above together with using optical switches in a binary search of subsets, that is, this half or that half, which quarter, which eight. Thus rather than the testing one fiber at a time, and with it the long blind time, the fibers are scrutinized with a binary search with each measurement on half the number of fibers. For example, when monitoring 32 fibers a signal is detected, first measure 16 and then the other 16, now the test is cut in half. Do the same thing 8 and 8 for the side with the detection, then 4×4, 2×2, and then 1×1 for the final discovery. This can be preferable to the time division multiplexing scan.

In addition to the monitoring system above which provides an alert, this may be combined with an active jamming method which applies a jamming signal in the event that the light signals, such as monitoring DAS signal are detected. In the Active Jamming the system operates using one or more of the following:

—a— Detect the fiber at play using one of the above methods, measure the wavelength of the detected signal and jam with a precise match using a tunable laser. This might require an optical device such as an optical switch or coupler. When a signal is detected, the exact wavelength is emitted as a jamming signal. The detection and wavelength selection may be repeatedly cycled to detect if and when an intruder changes wavelength of the transmitted signal.

—b— Detect the fiber at play using an above method and jam it specifically while continuing to monitor all other fibers.

—c— Use a Continuous wave CW laser of significant spectral width, or swept spectral width.

—d— Use 1×N splitter and apply a signal which is arranged to supplied to all fibers to jam them all. This has the disadvantage that it acts to decrease available optical power.

—e— Use a Continuous wave CW.

—f— Jam with high power non-CW Fabry-Perot laser for wavelength chirping.

—g— Pulse the jamming signal in time randomly.

—h— Pulse the jamming signal with randomized pulse widths and/or randomized pulse occurrence.

—i— Pulse the jamming signal with pulses in time with a mathematical pattern.

—j— Pulse the jamming signal with modulated wavelength with a selected waveform which may be for example sine or triangle waveform as these can defeat adversarial wavelength filtering. In a DAS. For example, the receiver portion typically includes a dense wavelength division multiplexer (DWDM) as a very narrow wavelength filter. In order to jam this, one needs to know precise wavelength, or as an alternative approach, sweep or chirp the jamming wavelength to assure that the jamming signal passes through the DWDM.

—k— Pulse the jamming signal with a combination of pulse and wavelength modulation.

The system can also be used in a manner using a suitable switch such that jamming only occurs when the protected room is in use. Unnecessary, continuous jamming can give the nefarious actors excessive access to the jamming technology and specifics, increasing the opportunity for developing a work-around or method for countering the jamming technique.

The following detection algorithms can be used to detect the laser pulses used for a DAS sensing system:

—a— Simple Boundary: the amplitude of the integrated pulse of either a DAS or a network transmitter is orders of magnitude higher than a dark fiber, and is easily detected using simple amplitude measurement. One algorithm detects when a signal crosses a boundary, and sounds an alarm.

—b— Combined Boundary as above with added level monitoring as a failsafe so as to be alerted when a signal appears and that it is still present after a period of time.

—c— Use of the slope vs time algorithm as defined above to detect intermittent access to fibers.

All activity is reported to a central management system which alerts an operator of unexpected activity.

The arrangement herein is preferably implemented in a Patch panel architecture.

An additional design incorporates this into a patch panel architecture with input and output connectors for every fiber. The system acts to pass 100% of the fibers through this device with highly asymmetrical tap couplers on each fiber. The tap coupler allows data passes through and a small proportion is tapped to be monitored. This can be of the order of 95% passed and the tapped 5% is monitored. This avoids the necessity for other systems such as the switching as above to discern which of the fibers are active intentionally or nefariously. In this method, each input feeds the asymmetrical tap coupler to pass a majority of the signal to an output port of the patch panel while acting to monitor the small percentage for activity.

It is desirable also to set-up screen in the central monitoring system for selecting which fibers expect activity, that is are the data fibers, and which do not, that is the unused fibers.

It is desirable also to provide an LED indicator over each fiber pair in the patch panel indicating presence of activity either expected or nefarious. Theu for example, the LEDs may be illuminated if active with a color such as green if expected activity and with a color such as red if unknown or nefarious.

Jamming capability can be provided in the patch panel as above when unexpected or assumed nefarious activity detected. In this way the patch panel provides the addition of optical components for detection of the eavesdropping signal concurrent with data transmission. One method would be for the nefarious party, with knowledge of the data characteristics, to configure eavesdropping signal at a different optical wavelength; and adding the wavelength specific detection system overcomes that strategy.

BRIEF DESCRIPTION OF THE DRAWINGS

One embodiment of the invention will now be described in conjunction with the accompanying drawings in which.

DETAILED DESCRIPTION

Figure 1:
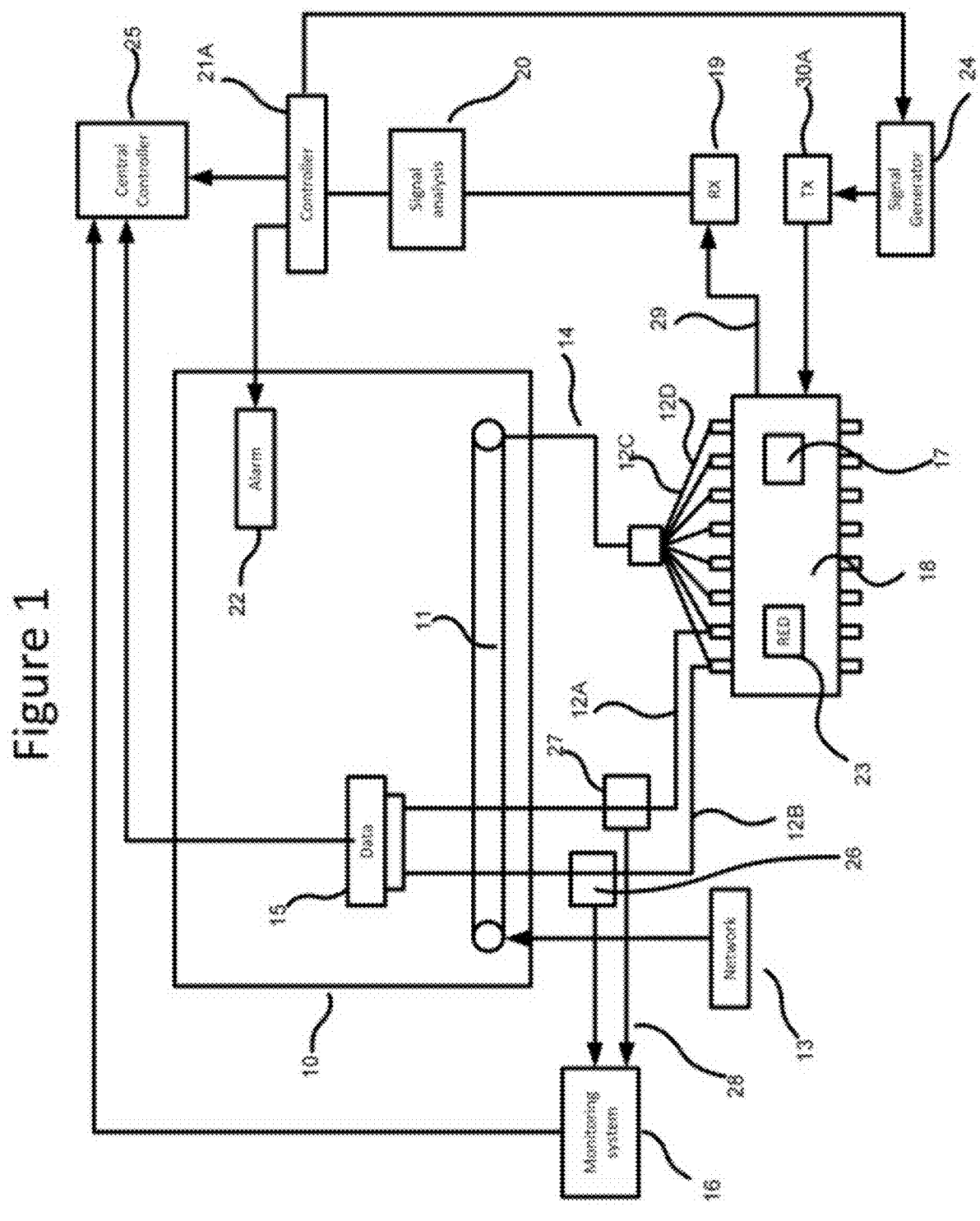
FIG. 1 is a schematic illustration of a method and apparatus according to the present invention where a secure room is provided for secure communications generating sound such as voices which is connected to an optical fiber network for data communications through an optical cable where the fibers of the cable are monitored to ensure security of the communications.

In FIG. 1 is shown the components of a method for securement of optical fibers in a network of optical fibers.

The system includes a secure room 10 such as a conference room, executive office, or network distribution room in which sounds are created which contain sensitive data such as oral conversations. A cable 11 containing optical fibers 12 is connected to a network 13 and includes a section 14 of the cable which is located in the vicinity of the secure room 10 so that at least one of the fibers vibrates or can vibrate in response to the sounds in the room. e of the fibers 12A and 12B contain transmitted data which is connected to a data processor 15 in the room such as a telephone communications system.

At least some of the fibers 12C and 12D are dark or unused and are available for future connection if required.

The unused fibers are connected either individually or in groups using a multiplex system 17 in a patch panel 18 to a receiver 19 where at least some the fibers have the signal thereof connected to a signal analysis system 20 for detecting transmission therealong of pulsed laser signals of the type such as DAS signals which are used for monitoring fiber vibration and/or movement. The result of the signal analysis and particularly the detection of such DAS signals is communicated to a controller which uses the analysis to issue an alarm at a suitable alarm signaling device 22 and to communicate to an LED display 23 on the housing of the patch panel 18. The controller also communicates this to the central or remote monitor 25. The central monitor 25 thus can contain information relating to the fibers which are dark fibers and the fibers which are data fibers where this information can be used in the analysis at the analysis system 21. The controller 21A also communicates the result of the analysis to a remote controller 25 which has information identifying which fibers are data fibers and which fibers are unused fibers so that the analysis can be completed as to whether the signals detected at the signal analysis 20 are indeed actual intrusion attempts. The central monitoring device is connected to multiple patch panels. Preferably the central monitoring device is programed with information as to which fibers should have a signal detected and which should not. This enables discrimination and alarm reporting when a signal is detected on an unintended fiber.

The patch panel is typically located in the secure room 10 so that the cable 11 itself enters the room and has the fibers 12 thereof connected to the patch panel 18 and thus to the outlets 30 in the room at the patch panel. The patch panel itself thus provides a source of the fibers that may resonate or vibrate in response to sounds in the room.

As set forth above some of the fibers which are monitored are data fibers which contain transmitted data and some are dark or unused fibers. In relation to the data fibers the transmitted data on the Rx fiber is separated by a splitter 26 or 27 from other signals on the fiber to allow the other which are possibly monitoring or nefarious signals shown at 28 to be monitored at the monitoring system 16 to detect the light signals which are improperly used for monitoring of fiber vibration and/or movement.

In relation the fibers which are unused or dark fibers which therefore do not contain transmitted data all signals on the fiber 29 are transferred to a receiver 19 and communicated to the signal analysis component 20 where they are monitored to detect the light signals used nefariously for monitoring of fiber vibration and/or movement.

Figure 5:
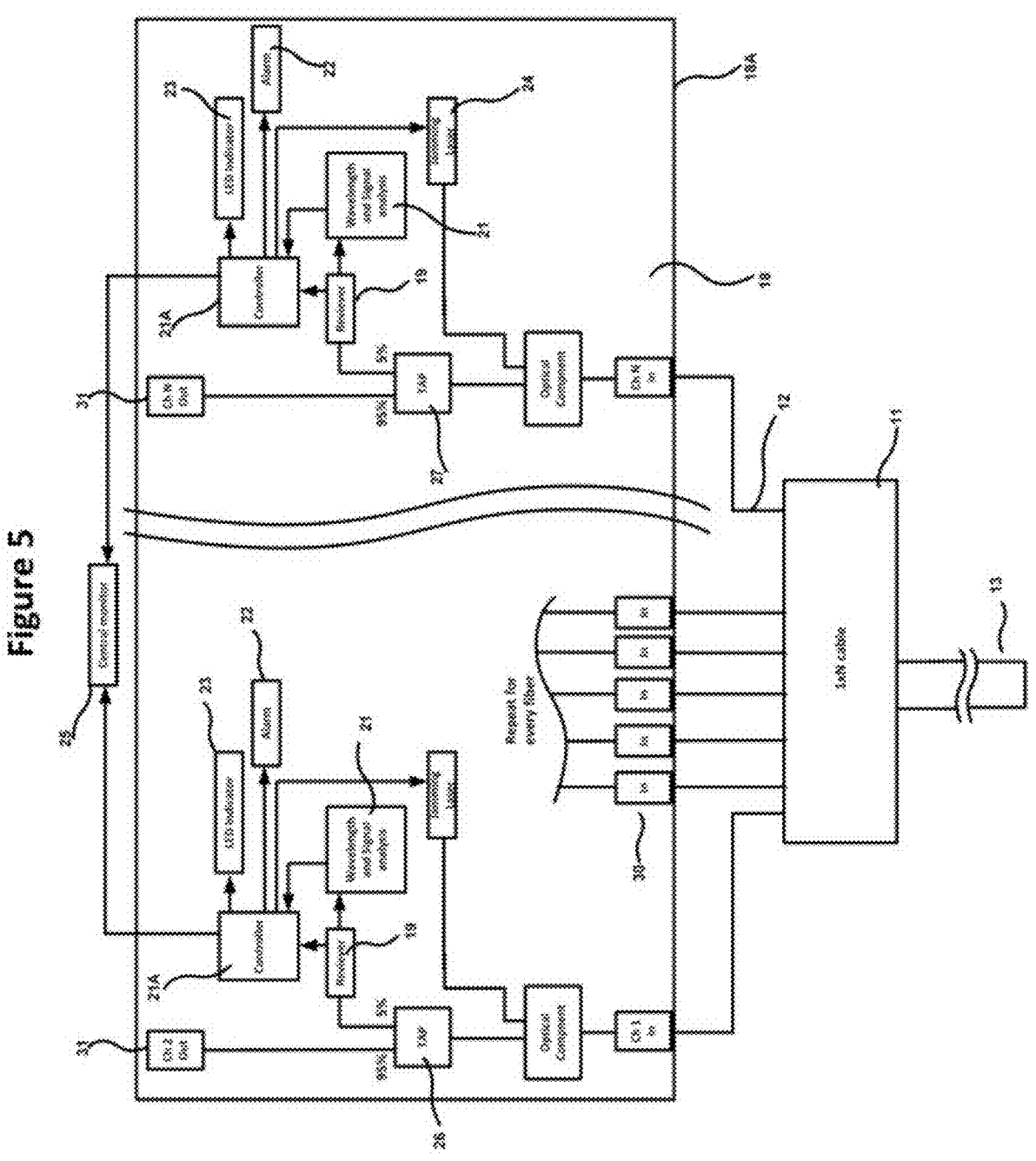
FIG. 5 is a schematic illustration of the patch panel 18 of FIG. 1.

As shown in FIG. 5 the monitored fibers 12 from the cable 13 are connected at the end to a respective one of a series of input terminals 30 of the patch 18 panel and the monitoring is carried out by the signal analysis system 21 which is connected to the respective input 30 of patch panel. That is each input terminal is associated with a respective signal monitoring system including the analysis system 21. In the analysis system, the presence of a nefarious monitoring signal is detected by measuring an amplitude of a total signal in the fiber which includes the nefarious monitoring signal. Where these signals are pulses which are typically used in DAS systems, the amplitude measured is related to an integration of the pulse signals. That is the monitoring signal is detected from the total signal in the fiber excluding any data signals. This amplitude system avoids any requirement to determine a wavelength of the signals at this stage. The analysis of the amplitude can include an added level monitoring as a failsafe, that is an indication alert is emitted when a signal appears and then remains present for an extended time period. In another arrangement, the monitoring is carried out by a use of slope vs time algorithm as this can detect the nefarious signals in a case where the nefarious actor has only intermittent access to the fiber concerned.

The patch panel 18 includes a housing 18A on an exterior of which is provided the plurality of input terminals 30 and a plurality of output terminals 31 to which the fibers are attached and wherein the monitoring and detection system are located in the housing 18A of the patch panel. The data component of the signals on the fibers are communicated by the tap coupler 26, 27 to the respective output terminal 31. That is the data on the fiber passes through to the output and a smaller proportion is tapped for monitoring by the receiver 19 and the wavelength and signal analysis system 21. The detection of a nefarious monitoring signal by the system 21 is communicated to the controller 21A. The controller 21A on detection of the signal communicates this to the alarm 22, the LED display 23 and the remote monitor 25.

Thus the patch panel 18 includes for each input fiber pair a respective LED indicator which is thus located at or associated with each fiber pair indicating presence of activity. This activity can either indicate the receipt of data and/or the detection of a nefarious monitoring signal.

Figure 2:
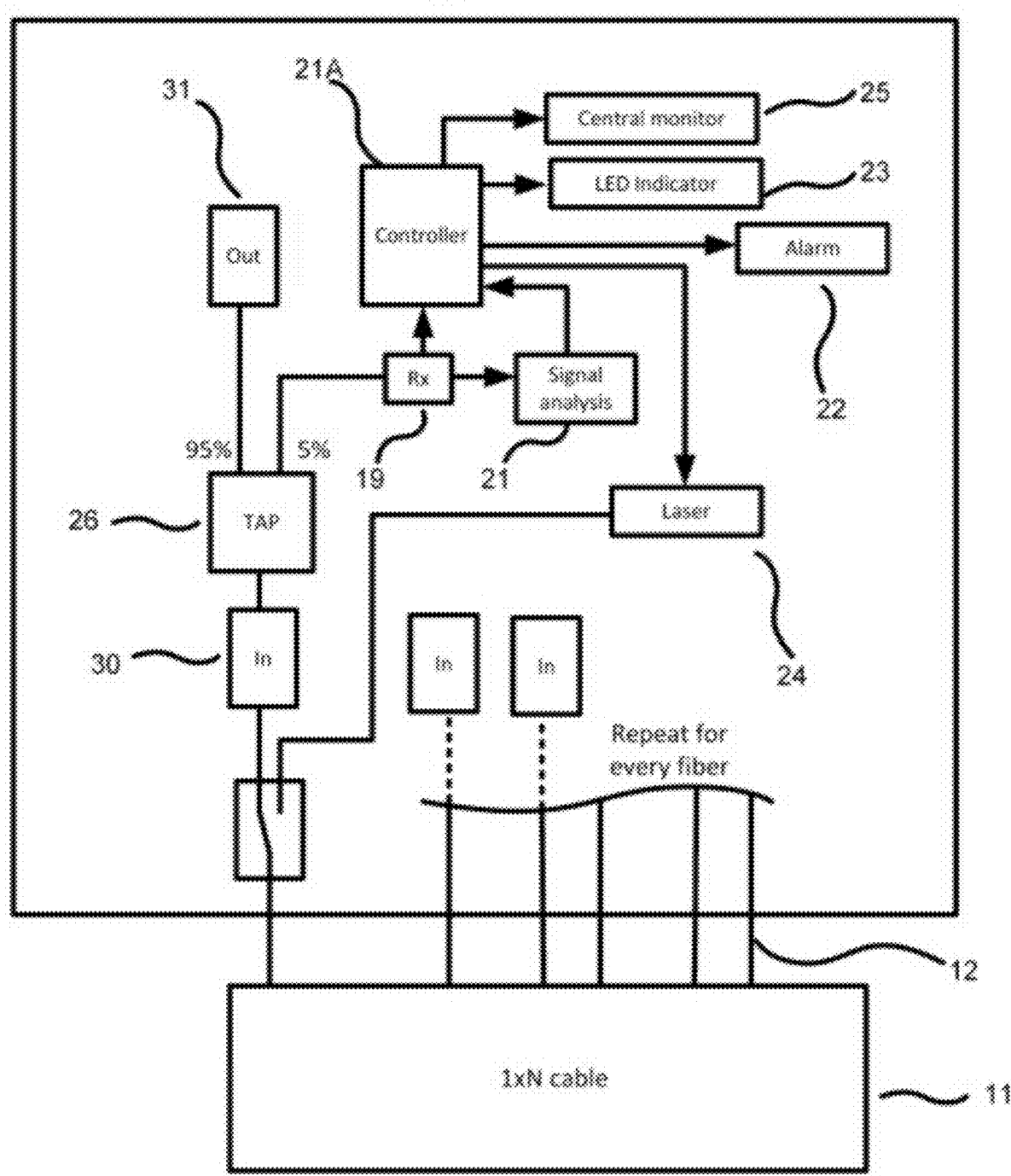
FIG. 2 is a schematic illustration of the method and apparatus of FIG. 1 showing the components for monitoring unused fibers for nefarious attempts to monitor signals on the unused fibers.

As shown in FIG. 2 the components described above are shown in more detail in respect of a single input/output pair.

Figure 4:
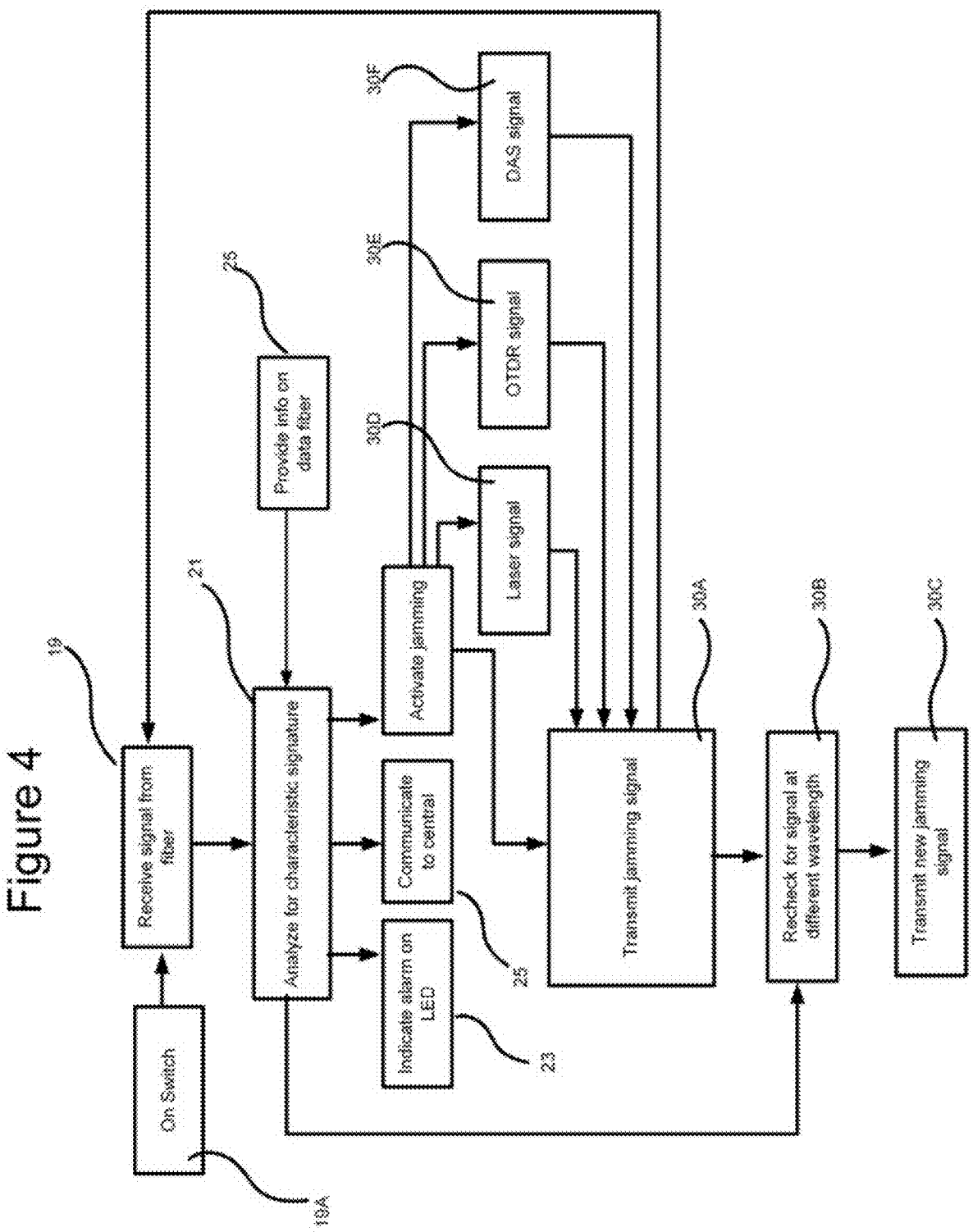
FIG. 4 is a flow chart setting out the steps of the method.

In the event that the nefarious DAS signals are detected, as shown in FIGS. 2 and 4, the controller also communicates to a signal generator 24 to generate jamming signals and transmitting, via a transmitter 30A through the patch panel into the monitored fibers 12C and/or 12D where the DAS signals have been detected, a jamming signal selected to interfere with detected nefarious signal. That is, in response to a detection of the pulsed laser signals by the signal analysis system, a wavelength analysis is carried out to detect the wavelength or to determine the characteristic signature of the nefarious signals received and the jamming signal selected to interfere with said monitoring of fiber vibration and/or movement is transmitted into the fiber.

In one arrangement, in response to the wavelength analysis, the signal generator 24 comprises a tunable CW laser is used to generate the jamming signal matching the wavelength.

In one arrangement, in response to the wavelength analysis, the signal generator 24 comprises a high-power non-CW Fabry-Perot laser for wavelength chirping.

In one arrangement, in response to the wavelength analysis, the signal generator 24 comprises a laser signal which is used to transmit the jamming signal as jamming disinformation.

In one arrangement, in response to the wavelength analysis, the signal generator 24 comprises a laser signal which is used to transmit the jamming signal as a jamming overwhelming signal.

In one arrangement as shown in FIG. 4, in response to the wavelength analysis, the signal generator 24 uses a system in which the analysis and transmission of the jamming signal are repeatedly and periodically cycled as shown at 30B and 30C to compensate for changing wavelength of the transmitter.

In one arrangement as shown in FIG. 4, the jamming signal is transmitted into the fiber while continuing to monitor all other fibers.

In one arrangement as shown in FIG. 4, the jamming signal as controlled by the jamming step is pulsed, as indicated at 30D, in time randomly, and/or pulsed with randomize pulse widths and/or random pulsed occurrence.

In one arrangement as shown in FIG. 4, the jamming signal as controlled by the jamming step an out of band OTDR signal is multiplexed, as indicated at 30E, to the fiber, and is used to measure the distance to the eavesdropping equipment.

In one arrangement as shown in FIG. 4, the jamming signal as controlled by the jamming step an out of band DAS signal is multiplexed, as indicated at 30F, to the fiber, which allows monitoring of sounds including voices at the eavesdropping location.

The out of band OTDR or DAS systems are multiple wavelength capable in order to compensate for the eavesdropping adversary attempts to jam the signal by changing wavelengths or injecting jamming wavelengths.

Preferably, one method of jamming is to inject a high power wavelength CW laser of the appropriate wavelength such that the adversarial receiver is saturated and "blinded", left unable to discern signal.

Preferably one method of jamming is to inject a chirping signal that passes the adversarial receivers wavelength filter and saturates the receiver.

Preferably one method for jamming is to inject a modulated signal which so distorts the analog of the eavesdropping signal such that no intelligence can be gained.

The system can also be used in a manner using a suitable switch 19A such that jamming only occurs when the protected room is in use.

Figure 3:
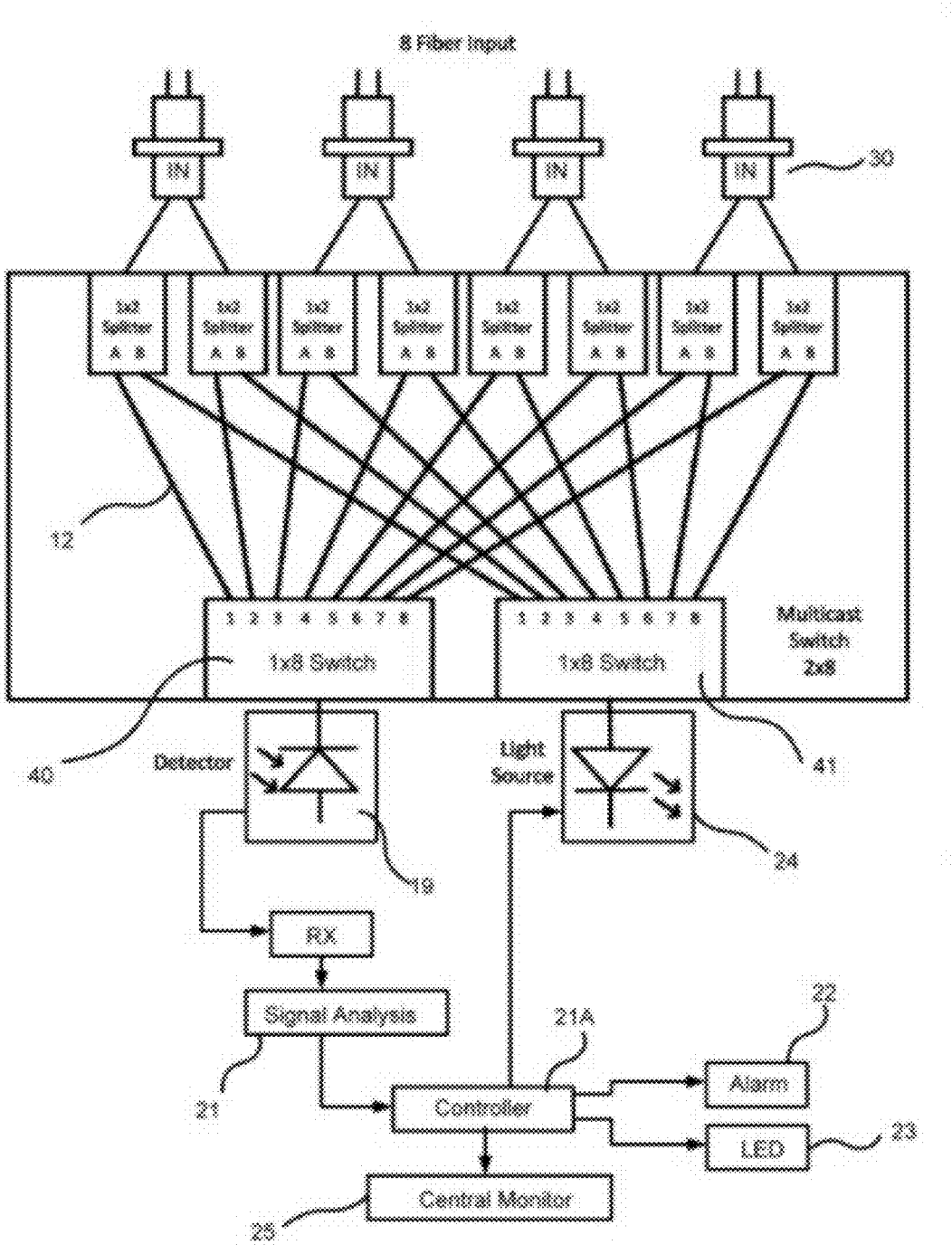
FIG. 3 is a schematic illustration of a method and apparatus of FIG. 1 showing the use of a MEMS switch to multiplex the incoming fibers for detection of the signals and for transmission of the jamming signals.

As shown in FIG. 3, a 1×N splitter 41 is used to transmit the jamming signal from the signal generator 24 to a plurality of the fibers. N can be 2 or a larger number depending on the architecture.

Also as shown in FIG. 3, at least two of the monitored fibers 12 are connected to a coupler 40 for common monitoring of two or more fibers.

Also as shown in FIG. 3 the splitter 40 and 41 act as optical switches for selecting one of more of the monitored fibers which are commonly monitored for detecting which of the fibers contains said light signals. This arrangement can act as a Fiber Optic Multicast Switch to allow individual fibers to be commonly monitored with a single detector. It is possible to use a commercially available device named known as a multicast optical switch to allow individual fibers to be monitored with a single detector. The speed of switch, particularly if utilizing Micro Electronic Mechanical System (MEMS) technology would minimize the time needed to scan all fibers. If a fiber is detected to have an unwanted signal, the Multicast Switch would allow a Light Source to be switched into that fiber to allow signal disruption.

The invention claimed is:

1. A method for securement of optical fibers in a network of optical fibers against intrusion attempts to detect sounds emitted in the vicinity of the fiber network;

where the network comprises at least one fiber cable containing a plurality of individual optical fibers, at least some of the fibers being selected for connection to data transmission systems for transmission of data along the selected fibers, the method comprising:

monitoring at least some of the fibers for detecting transmission therealong of light signals used for monitoring of fiber vibration and/or movement which provide information on said sounds;

and in response to a detection of said light signals providing an indication alert of an intrusion attempt to detect said sounds.

2. The method according to claim 1 wherein said light signals are narrow wavelength, low duty cycle, and high-powered laser pulses such as those used in a phase based Distributed Acoustic Sensing system.

3. The method according to claim 1 wherein said light signals have a broad wavelength such as the C-Band of 1550 nm.

4. The method according to claim 1 wherein said at least some of the fibers which are monitored are data fibers which contain transmitted data and wherein the transmitted data is separated from other signals on the fiber to allow the other signals to be monitored to detect said light signals used for monitoring of fiber vibration and/or movement.

5. The method according to claim 1 wherein said at least some of the fibers which are monitored are unused or dark fibers which therefore do not contain transmitted data and all signals on the fiber are monitored to detect said light signals used for monitoring of fiber vibration and/or movement.

6. The method according to claim 1 wherein the monitored fibers are connected at one end to an input terminal of a patch panel and the monitoring is carried out at said one end at said patch panel.

7. The method according to claim 1 wherein the fibers are monitored by detecting an amplitude of a total signal in the fiber which includes the integrated pulse signals.

8. The method according to claim 7 wherein the fibers are monitored by detecting the amplitude with added level monitoring as a fail safe, that is an indication alert is emitted when a signal appears and remains present.

9. The method according to claim 1 wherein the monitoring is carried out by a use of slope vs time algorithm to detect intermittent access to fibers.

10. The method according to claim 1 wherein the fiber network comprises a patch panel having a housing in which is provided a plurality of input and output terminals to which the fibers are attached and wherein the monitoring and detection system are located in the housing of the patch panel.

11. The method according to claim 10 wherein the patch panel includes an LED indicator at or associated with each transmit and receive fiber pair indicating presence of activity.

12. The method according to claim 1 wherein each monitored fiber includes a tap coupler where data on the fiber passes through and a smaller proportion is tapped for monitoring.

13. The method according to claim 1 wherein there is provided a central monitoring system which provides information for selecting which fibers expect activity and which are unused and hence do not expect activity so that this information can be correlated with data from the monitoring.

14. The method according to claim 1 wherein at least two of the monitored fibers are connected to a coupler for common monitoring of two or more fibers.

15. The method according to claim 14 including optical switches for selecting one of more of the monitored fibers which are commonly monitored for detecting which of the fibers contains said light signals.

16. The method according to claim 14 including a Fiber Optic Multicast Switch to allow individual fibers to be commonly monitored with a single detector.

17. The method according to claim 1 wherein, in response to a detection of said light signals, wavelength analysis is carried out to determine the wavelength of the said light signals and a jamming signal selected to interfere with said monitoring of fiber vibration and/or movement is transmitted into the fiber.

18. The method according to claim 17 wherein, in response to the wavelength analysis, a tunable CW laser is used to generate the jamming signal matching the wavelength.

19. The method according to claim 18 wherein the laser comprises a high-power non-CW Fabry-Perot laser for wavelength chirping.

20. The method according to claim 17 wherein in response to the wavelength analysis, a laser signal is used to transmit the jamming signal as jamming disinformation.

21. The method according to claim 17 wherein in response to the wavelength analysis, a laser signal is used to transmit the jamming signal as a jamming overwhelming signal.

22. The method according to claim 17 wherein in response to the wavelength analysis a laser signal is used to transmit the jamming signal and wherein the analysis and transmission of the jamming signal are repeatedly and periodically cycled to compensate for changing wavelength of the transmitter.

23. The method according to claim 17 wherein in response to a detection of the pulsed laser signals on a fiber, the jamming signal is transmitted into the fiber while continuing to monitor all other fibers.

24. The method according to claim 17 wherein a 1×N splitter is used to transmit the jamming signal to a plurality of the fibers.

25. The method according to claim 17 wherein the jamming signal is pulsed in time randomly, and/or pulsed with randomize pulse widths and/or random pulsed occurrence.

26. The method according to claim 17 wherein, in response to the wavelength analysis, an out of band OTDR signal is multiplexed in to the fiber, and is used to measure the distance to the eavesdropping equipment.

27. The method according to claim 17 wherein, in response to the wavelength analysis, an out of band DAS signal is multiplexed in to the fiber, which allows monitoring of sounds including voices at the eavesdropping location.

28. The method according to claim 17 wherein, out of band OTDR or DAS systems are multiple wavelength capable in order to compensate for the eavesdropping adversary attempts to interfere with the DAS or OTDR signal by changing wavelengths or injecting jamming wavelengths.

29. A method for securement of optical fibers in a network of optical fibers comprising:

providing a secure room in which sounds are created which may contain sensitive data;

wherein at least one cable containing optical fibers is located in the vicinity of the secure room so that at least one of the fibers vibrates in response to the sounds in the room;

monitoring at least some of the fibers for detecting transmission therealong of light signals used for monitoring fiber vibration and/or movement which provide information on said sounds;

and in response to a detection of said light signals providing an indication alert of an intrusion attempt to detect said sounds.

30. A method for securement of optical fibers in a network of optical fibers comprising:

providing a secure room in which sounds are created which may contain sensitive data;

wherein at least one cable containing optical fibers is located in the vicinity of the secure room so that at least one of the fibers vibrates in response to the sounds in the room;

wherein at least some of the fibers contain transmitted data;

wherein at least some of the fibers are dark or unused;

monitoring at least some of the fibers for detecting transmission therealong of light signals used for monitoring fiber vibration and/or movement which provide information on said sounds;

and in response to a detection of said light signals providing an indication alert of an intrusion attempt to detect said sounds.

* * * * *